US011349970B1

(12) United States Patent
Zhao et al.

(10) Patent No.: US 11,349,970 B1
(45) Date of Patent: May 31, 2022

(54) ROTATING COMPONENT AND TERMINAL DEVICE

(71) Applicant: BEIJING XIAOMI MOBILE SOFTWARE CO., LTD., Beijing (CN)

(72) Inventors: Lianjia Zhao, Beijing (CN); Xuehu Zhang, Beijing (CN); Yuantao Pei, Beijing (CN); Hongwei Jin, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 17/361,317

(22) Filed: Jun. 28, 2021

(30) Foreign Application Priority Data

Mar. 1, 2021 (CN) ........................ 202110226778.4

(51) Int. Cl.
*H04M 1/00* (2006.01)
*H04M 1/02* (2006.01)

(52) U.S. Cl.
CPC ....... *H04M 1/0214* (2013.01); *H04M 1/0268* (2013.01)

(58) Field of Classification Search
CPC ........ F16H 19/001; F16H 3/002; F16H 3/423; F16H 3/426; F16H 55/17; F16H 55/171; F16H 55/56; F16H 9/24; F16C 11/04
See application file for complete search history.

(56) References Cited

U.S. PATENT DOCUMENTS 6,748,249 B1 6/2004 Eromaki et al.
8,111,506 B2 * 2/2012 Wang ..................... H04M 1/23 361/679.08
10,352,354 B1 * 7/2019 Hsu ..................... G06F 1/1652
10,488,882 B2 * 11/2019 Maatta ..................... G06F 1/1618
11,086,356 B2 * 8/2021 Hou ..................... G06F 1/1616
2017/0235337 A1 * 8/2017 Vic ..................... E05D 11/00 361/679.55

FOREIGN PATENT DOCUMENTS

| | | | |
|---|---|---|---|
| CN | 204533175 | U | 8/2015 |
| CN | 209731301 | U | 12/2019 |
| CN | 111601484 | A | 8/2020 |
| CN | 112178040 | A | 1/2021 |
| EP | 1051012 | A2 | 11/2000 |

OTHER PUBLICATIONS

European Search Report in the European application No. 21182388.5, dated Dec. 17, 2021,(10p).

* cited by examiner

*Primary Examiner* — Nhan T Le
(74) *Attorney, Agent, or Firm* — Arch & Lake LLP

(57) ABSTRACT

The disclosure relates to a rotating component and a terminal device. The rotating component includes: a hinge bracket; a movable strip disposed on the hinge bracket, the movable strip including a first meshing portion facing toward the hinge bracket and a second meshing portion facing away from the hinge bracket. The rotating component further includes two rotating structures, where the first rotating structure is disposed on one side of the movable strip and meshed with the first meshing portion, and the second rotating structure is disposed on another side of the movable strip and meshed with the second meshing portion. When the movable strip moves, the two rotating structures rotate synchronously in opposite rotation directions.

15 Claims, 8 Drawing Sheets

100

103
102
103
101

ROTATING COMPONENT AND TERMINAL DEVICE

CROSS-REFERENCE TO RELATED APPLICATION

The present application claims priority to Chinese patent application No. 202110226778.4, filed on Mar. 1, 2021, the entire content of which is incorporated herein by reference for all purposes.

TECHNICAL FIELD

The disclosure relates to the technical field of electronic devices, and more particularly, to a rotating component and a terminal device.

BACKGROUND

With the development of a flexible Organic Light-Emitting Diode (OLED) technology, foldable phones have gradually become an important development direction of terminal devices. For example, a user can receive a call or process simple text information conveniently and rapidly without unfolding a foldable phone. When the user needs to process an office document, read an electronic book, or watch a video, the phone can be unfolded to easily obtain a better large-screen experience. Therefore, the foldable phone is convenient to carry, and can bring an extreme over-large screen experience to the user.

At present, the foldable phone can be unfolded and folded through a rotating component. The conventional rotating component is generally implemented by adopting a transmission mode of six gears and five meshing points, and there is a problem of large matching clearance due to an assembly tolerance accumulation caused by a complex structure.

SUMMARY

The disclosure provides a rotating component and a terminal device. The structure of the rotating component can be simplified, the condition of large matching clearance due to an assembly tolerance accumulation caused by complex assembly can be reduced, and the synchronization effect of the rotating component can be improved.

According to a first aspect of the disclosure, a rotating component is provided. The rotating component includes: a hinge bracket; a movable strip disposed on the hinge bracket, the movable strip comprising a first meshing portion facing toward the hinge bracket and a second meshing portion facing away from the hinge bracket; and two rotating structures, a first rotating structure being disposed on a first side of the movable strip and meshed with the first meshing portion, and a second rotating structure being disposed on a second side of the movable strip and meshed with the second meshing portion, wherein when the movable strip moves, the two rotating structures rotate synchronously in opposite rotation directions.

According to a second aspect of the disclosure, a terminal device is provided. The terminal device includes: a first middle frame; a second middle frame; and at least one rotating component, the at least one rotating component comprising: a hinge bracket; a movable strip disposed on the hinge bracket, the movable strip comprising a first meshing portion facing toward the hinge bracket and a second meshing portion facing away from the hinge bracket; and two rotating structures, a first rotating structure being disposed on a first side of the movable strip and meshed with the first meshing portion, and a second rotating structure being disposed on a second side of the movable strip and meshed with the second meshing portion, wherein when the movable strip moves, the two rotating structures rotate synchronously in opposite rotation directions, wherein the at least one rotating component is located in a hinge groove formed by the first middle frame and the second middle frame, the first rotating structure of the at least one rotating component is fixed on the first middle frame and the second rotating structure of the at least one rotating component is fixed on the second middle frame, and wherein when the two rotating structures of the at least one rotating component rotate synchronously, the first middle frame and the second middle frame are driven to rotate synchronously.

It should be understood that the above general descriptions and detailed descriptions below are only exemplary and explanatory, and not intended to limit the disclosure.

BRIEF DESCRIPTION OF THE DRAWINGS

The accompanying drawings, which are incorporated in and constitute a part of this specification, illustrate examples consistent with the disclosure and, together with the specification, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

Figure 1:
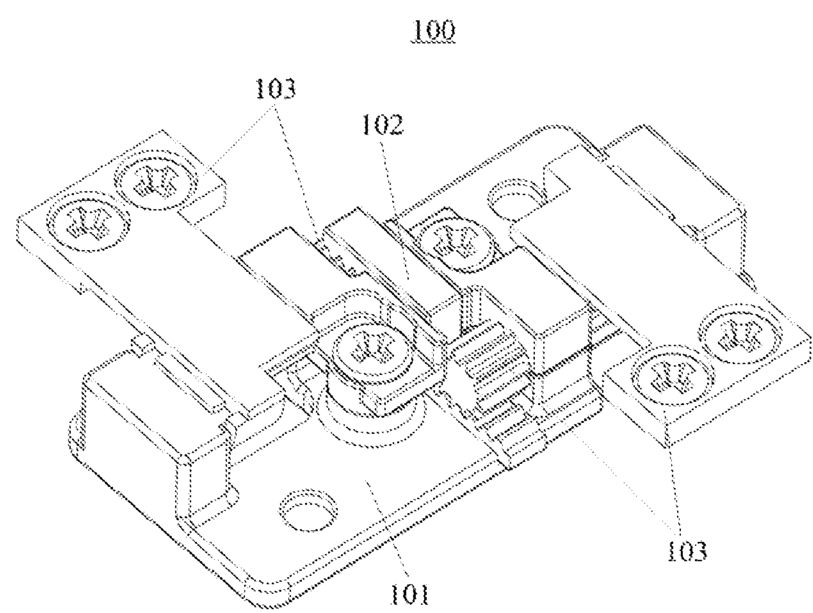
FIG. 1 is a first schematic diagram of a rotating component according to one or more examples of the present disclosure.
Figure 2:
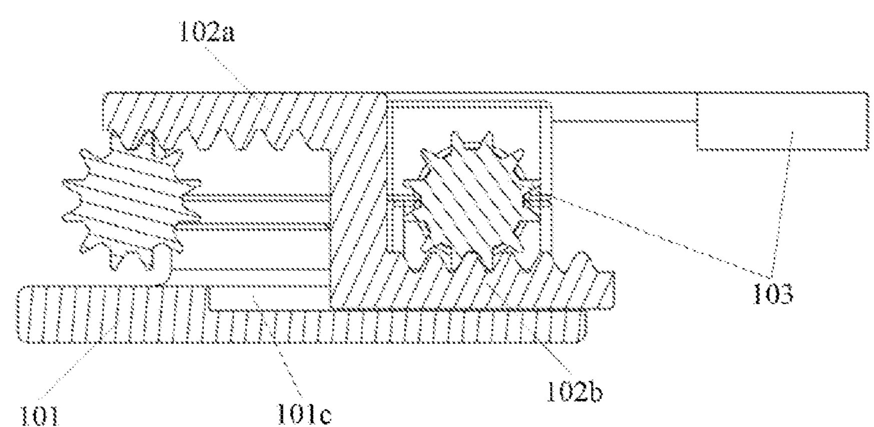
FIG. 2 is a second schematic diagram of a rotating component according to one or more examples of the present disclosure.

FIG. 1 is a first schematic diagram of a rotating component according to an example of the present disclosure. FIG. 2 is a second schematic diagram of a rotating component according to an example of the present disclosure. As shown in FIGS. 1 and 2, a rotating component 100 includes:

a hinge bracket 101;

a movable strip 102 located on the hinge bracket 101, the movable strip 102 including a first meshing portion 102*a* facing toward the hinge bracket 101 and a second meshing portion 102*b* facing away from the hinge bracket 101; and two rotating structures 103, in which one of the rotating structures 103 is disposed on one side of the movable strip 102 and is meshed with the first meshing portion 102*a*, and the other one of the rotating structures 103 is disposed on another side of the movable strip 102 and meshed with the second meshing portion 102*b*.

When the movable strip 102 moves, the two rotating structures 103 rotate synchronously in opposite rotation directions.

In the examples of the disclosure, the rotating component may be exerted on a terminal device with a folding function, such as a foldable phone. For example, the rotating component enables two folding portions to synchronously move in a folding process of the foldable phone so that a screen on the foldable phone is uniformly and symmetrically stressed in a bending process, and also enables the inner sides of the two folding portions to have fixed bending angles in the folding process of the foldable phone.

The movable strip is located on the hinge bracket and is movable relative to the hinge bracket. In some examples, a contact surface between the movable strip with the hinge bracket is smooth. As such, the movable strip is movable on the hinge bracket better through the smooth contact surface.

In the examples of the disclosure, the movable strip extends in opposite directions to form a first meshing portion and a second meshing portion. The rotating structure at least includes gears, and one of the two gears of the two rotating structures may be meshed with the first meshing portion and the other one of the two gears of the two rotating structures may be meshed with the second meshing portion.

In some examples, the first meshing portion and the second meshing portion may be parallel to the hinge bracket. In some examples, the first meshing portion and the second meshing portion may be located in the same plane. In other examples, the first meshing portion and the second meshing portion may be located in different planes. In some examples, as shown in FIG. 2, the movable strip further includes: a connection column for connecting the first meshing portion 102*a* and the second meshing portion 102*b* with each other. The connection column may be perpendicular to a plane where the first meshing portion is located and a plane where the second meshing portion is located. In other examples, the movable strip is Z-shaped.

It should be noted that the connection column may act as a stopper for limiting the rotation of the gear on the first meshing portion or the gear on the second meshing portion. For example, the gear may be prevented from continuing to rotate in the direction of the first meshing portion or the second meshing portion by means of the connection column, so that a rotation angle of the gear can be limited. In other examples, the connection column may also act as a spacer for isolating the two gears located on the movable strip from each other to reduce interference caused by the rotation of the two gears.

The rotating structure can rotate relative to the hinge bracket. For example, the rotating structure can rotate relative to the hinge bracket through an external force exerted on the rotating structure. For example, the movement of the movable strip can drive the rotating structure to rotate relative to the hinge bracket.

In the examples of the disclosure, when the movable strip moves, the two rotating structures rotate synchronously. That is, when one of the two rotating structures rotates, the other one of the two rotating structures rotates accordingly. The synchronous transmission of the two rotating structures on two sides of the movable strip can be achieved based on meshing of the movable strip and the two rotating structures.

It should be noted that each of the first meshing portion and the second meshing portion is provided with teeth, and the teeth of the first meshing portion and the teeth of the second meshing portion are distributed in the same manner. For example, two adjacent teeth are equally spaced and/or have the same size. As such, when the two rotating structures rotate synchronously, the two rotating structures have the same rotation angle.

In the examples of the disclosure, when the movable strip moves, the two rotating structures rotate in opposite rotation directions. That is, the two rotating structures located on two opposite sides of the movable strip can rotate in opposite directions by means of the first meshing portion and the second meshing portion opposite to each other. For example, one of the rotating structures may rotate in a clockwise direction, and the other one of the rotating structures may rotate in a counterclockwise direction.

It should be noted that the two rotating structures may be connected to two middle frames of a terminal device having a foldable screen, and the foldable screen of the terminal device can be switched between an unfolded state and a folded state by the synchronous rotation of the two rotating structures. For example, when the two rotating structures rotate simultaneously in a direction away from the hinge bracket until an angle between the two rotating structures increases to 180 degrees, the two middle frames of the terminal device are in the same plane, and the foldable screen of the terminal device is in the unfolded state.

For example, when the two rotating structures rotate simultaneously in a direction close to the hinge bracket until an angle between the two rotating structures decreases to 0 degrees, the two middle frames of the terminal device are parallel, and the foldable screen of the terminal device is in the folded state. In the examples of the disclosure, the two rotating structures can rotate synchronously by means of the first meshing portion and the second meshing portion of the movable strip, so that components for implementing synchronous rotation can be reduced, the condition of large matching clearance due to an assembly tolerance accumulation caused by assembling a plurality of complex devices in the rotating component can be reduced, and the effect of synchronous rotation can be improved. Furthermore, in the process of driving the foldable screen to be folded, the foldable screen can be accurately and synchronously folded or unfolded.

In the examples of the disclosure, one of the two rotating structures is disposed on one side of the movable strip and the other one of the two rotating structures is disposed on another side of the movable strip, and when the movable strip moves, the two rotating structures rotate synchronously in opposite rotation directions. That is, in the examples of the disclosure, only one movable strip is needed to drive the two rotating structures to rotate synchronously in opposite rotation directions. As such, the structure of the rotating component can be simplified, the condition of large matching clearance due to an assembly tolerance accumulation caused by complex assembly of the rotating component can be reduced, and the synchronization effect of the rotating component can be improved.

Moreover, when the movable strip moves, the rotating structures rotate in opposite rotation directions. That is, the movable strip can drive the two rotating structures to rotate in opposite directions, so that when the two rotating structures rotate simultaneously in a direction away from the hinge bracket, the two rotating structures can be unfolded relative to the hinge bracket. When the two rotating structures rotate simultaneously in direction close to the hinge bracket, the two rotating structures can be folded relative to the hinge bracket.

Figure 3:
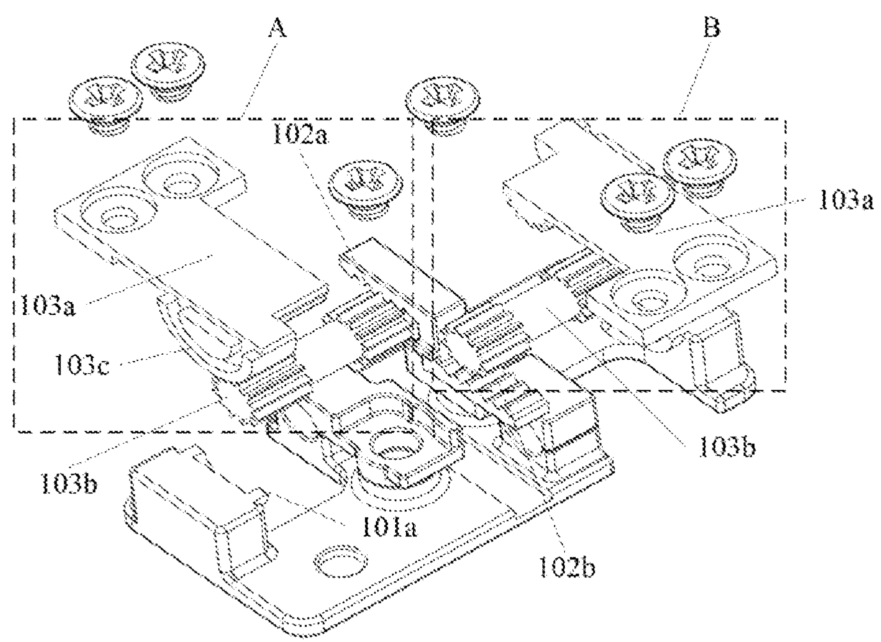
FIG. 3 is a third schematic diagram of a rotating component according to one or more examples of the present disclosure.

In some examples, as shown in FIGS. 1 and 3, each rotating structure includes a rotating slider 103*a* and a gear 103*b* connecting the rotating slider 103*a* and the movable strip 102 with each other.

The movable strip is matched with the gear, and the gear is matched with the rotating slider. When the movable strip 102 moves, the two gears 103*b* of the two rotating structures 103 rotate in opposite rotation directions, and the rotation of the two gears 103*b* drives the two rotating sliders 103*a* of the two rotating structures 103 to rotate in opposite directions.

In the examples of the disclosure, one rotating structure corresponds to one rotating slider and one gear. The rotating slider and the gear can be matched with each other, the rotation of the gear can drive the rotating slider to rotate, and the rotation of the rotating slider can also drive the gear to rotate.

One of the two rotating structures is disposed on one side of the movable strip and the other one of the two rotating structures is disposed on another side of the movable strip. When the movable strip moves, the two gears connected to the movable strip rotate synchronously in opposite rotation directions. For example, when the movable strip moves, one gear may rotate in a clockwise direction and the other gear may rotate in a counterclockwise direction.

Moreover, the two gears drive the two rotating sliders connected to the two gears to rotate in opposite directions. That is, the two rotating sliders in the examples of the disclosure can rotate synchronously through the two gears and one movable strip, so that the structure of the rotating component is simple. Compared with the related art in which six gears are used, only two gears are needed in the examples of the disclosure. Therefore, in the examples of the disclosure, gear meshing points needed for synchronization can be reduced, the meshing vacancies can be further reduced, the condition of large matching clearance due to an assembly tolerance accumulation caused by complex assembly of a plurality of gears can be reduced, and the synchronization effect of the rotating component can be improved.

In some examples, as shown in FIG. 3, the rotating slider is provided with a third meshing portion, and the two rotating structures include a first rotating structure A and a second rotating structure B.

The first meshing portion 102*a* is meshed with one end of the gear 103*b* of the first rotating structure A, and the third meshing portion of the rotating slider 103*a* of the first rotating structure A is meshed with another end of the gear 103*b* of the first rotating structure A opposite to said one end.

The second meshing portion 102*b* is meshed with one end of the gear 103*b* of the second rotating structure B, and the third meshing portion of the rotating slider 103*a* of the second rotating structure B is meshed with another end of the gear 103*b* of the second rotating structure B opposite to said one end.

In the examples of the disclosure, the gear may be an elongated gear, and may also be a gear having teeth at two ends, which is not limited by the examples of the disclosure.

The gear of the first rotating structure includes a first synchronous rotating shaft, first teeth, and second teeth. The first teeth are located at one end of the first synchronous rotating shaft and the second teeth are located at another end of the first synchronous rotating shaft. The first teeth are meshed with the first meshing portion. The second teeth are meshed with the third meshing portion of the rotating slider of the first rotating structure. The third meshing portion is provided with teeth, and the teeth of the third meshing portion and the second teeth have the same size and the same shape.

The gear of the second rotating structure includes a second synchronous rotating shaft, third teeth, and fourth teeth. The third teeth are located at one end of the second synchronous rotating shaft and the fourth teeth are located at another end of the second synchronous rotating shaft. The third teeth are meshed with the second meshing portion. The fourth teeth are meshed with the third meshing portion of the rotating slider of the second rotating structure. The third meshing portion is provided with teeth, and the teeth of the third meshing portion and the fourth teeth have the same size and the same shape.

In the examples of the disclosure, the first meshing portion is meshed with one end of the gear of the first rotating structure, and the third meshing portion of the rotating slider of the first rotating structure is meshed with another end of the gear of the first rotating structure opposite to said one end. That is, the first meshing portion, the third meshing portion of the rotating slider of the first rotating structure, and the teeth of the first rotating structure are meshed with one another to form a transmission between the first rotating structure and the movable strip.

The second meshing portion is meshed with one end of the gear of the second rotating structure, and the third meshing portion of the rotating slider of the second rotating structure is meshed with another end of the gear of the second rotating structure opposite to said one end. That is, the first meshing portion, the third meshing portion of the rotating slider of the second rotating structure, and the teeth of the first rotating structure are meshed with each other to form a transmission between the second rotating structure and the movable strip.

It should be noted that each gear includes a gear shaft and teeth connected to two ends of the gear shaft. The first meshing portion may be meshed with the teeth at one end of the gear of the first rotating structure, and the third meshing portion of the rotating slider of the first rotating structure may be meshed with the teeth at another end of the gear of the first rotating structure. The second meshing portion may be meshed with the teeth at one end of the gear of the second rotating structure, and the third meshing portion of the rotating slider of the second rotating structure may be meshed with the teeth at another end of the gear of the second rotating structure.

Figure 4:
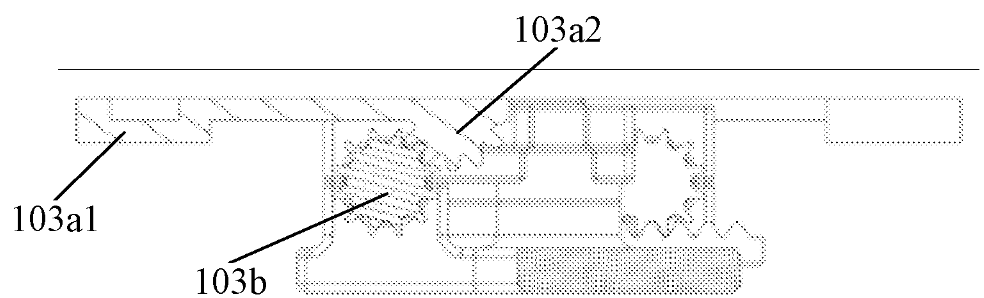
FIG. 4 is a fourth schematic diagram of a rotating component according to one or more examples of the present disclosure.

In some examples, as shown in FIG. 4, the rotating slider 103*a* includes:

a rotating portion 103*a*1; and a third meshing portion 103*a*2, in which the third meshing portion 103*a*2 is located at one end of the rotating slider 103*a* and the rotating portion 103*a*1 is located at another end of the rotating slider 103*a* opposite to said one end, and the third meshing portion 103*a*2 is capable to be meshed with the gear 103*b*.

When an external force is exerted on the rotating portion to drive the rotating portion into rotation, the movable strip is driven to move through the third meshing portion and the gear.

In the examples of the disclosure, the two rotating structures include a first rotating structure and a second rotating structure. When an external force is exerted on the rotating portion of the rotating slider of the first rotating structure, the movable strip can be driven to move through the third meshing portion of the rotating slider, the gear of the first rotating structure, and the first meshing portion of the first rotating structure. When the movable strip moves, the rotating portion of the second rotating structure can be driven to rotate through the second meshing portion, the gear of the second rotating structure, and the third meshing portion of the rotating slider in the second rotating structure. Furthermore, transmission among the first rotating structure, the movable strip, and the second rotating structure is realized, so that the rotating slider of the first rotating structure and the rotating slider of the second rotating structure can rotate synchronously.

It should be noted that one of the two rotating portions of the two rotating structures may be fixedly connected to one of the two middle frames of the terminal device and the other one of the two rotating portions of the two rotating structures may be fixedly connected to the other one of the two middle frames of the terminal device. Therefore, when an external force is exerted on the rotating portions through the middle frames, the two middle frames can rotate synchronously relative to the hinge bracket, so that the two middle frames can be folded or unfolded.

Figure 5:
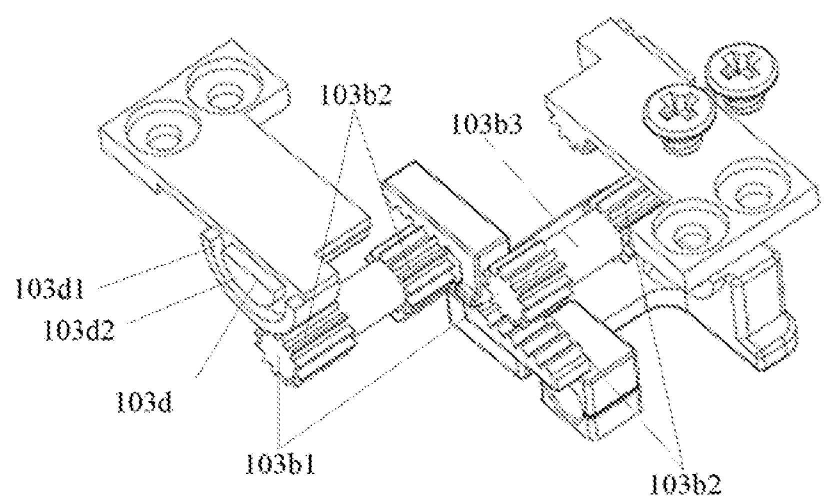
FIG. 5 is a fifth schematic diagram of a rotating component according to one or more examples of the present disclosure.

In some examples, as shown in FIGS. 3 and 5, the rotating slider further includes:

a trajectory limiting portion 103*d* disposed opposite to the third meshing portion, in which the trajectory limiting portion 103*d* and the third meshing portion are located on a same side of the rotating slider, and the trajectory limiting portion 103*d* is provided with an arc-shaped guide groove 103*c*.

A surface of the hinge bracket facing toward the gear is provided with an arc-shaped protrusion 101*a*.

The arc-shaped protrusion 101*a* is embedded in the arc-shaped guide groove 103*c*.

In the examples of the disclosure, the trajectory limiting portion 103*d* is used to limit a rotating trajectory of the rotating slider.

The arc-shaped protrusion is matched with the arc-shaped guide groove, so that the arc-shaped protrusion and the arc-shaped guide groove are slidable relative to each other. The matching between the arc-shaped protrusion and the arc-shaped guide groove includes: size matching between the arc-shaped protrusion and the arc-shaped guide groove; or shape matching between the arc-shaped protrusion and the arc-shaped guide groove.

It should be noted that when the rotating slider rotates, the purpose of limiting the rotating trajectory of the rotating slider can be achieved based on the mutual matching between the arc-shaped protrusion and the arc-shaped guide groove, so that the rotating trajectory of rotating sliding is more accurate.

In some examples, the trajectory limiting portion 103*d* includes a first arc-shaped block 103*d*1 and a second arc-shaped block 103*d*2 spaced apart from the first arc-shaped block 103*d*1.

The first arc-shaped block 103*d*1 and the second arc-shaped block 103*d*2 form the arc-shaped guide groove.

In the examples of the disclosure, a spacing distance between the first arc-shaped block 103*d*1 and the second arc-shaped block 103*d*2 is matched with the width of the arc-shaped protrusion. As such, the arc-shaped protrusion and the arc-shaped guide groove can be better matched with each other, and a moving trajectory of the rotating slider can be better limited.

Exemplarily, each of the first arc-shaped block 103*d*1 and the second arc-shaped block 103*d*2 may be a semi-circular block or a quadrant block, which is not limited by the examples of the disclosure.

Figure 6:
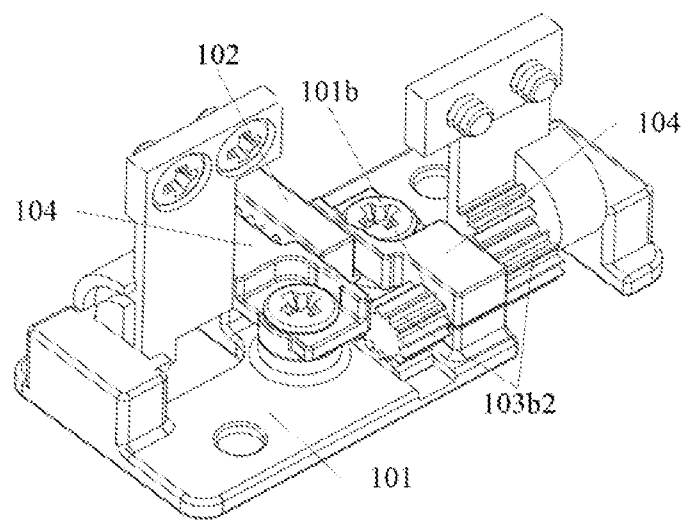
FIG. 6 is a sixth schematic diagram of a rotating component according to one or more examples of the present disclosure.

In some examples, as shown in FIGS. 5 and 6, the gear includes a synchronous rotating shaft 103*b*1 and teeth 103*b*2 at two ends of the synchronous rotating shaft 103*b*1.

The hinge bracket is provided with a fixing groove 101*b*.

The teeth 103*b*2 at the two ends of the synchronous rotating shaft are located outside the fixing groove, and a middle portion 103*b*3 between the two ends is located inside the fixing groove.

In the examples of the disclosure, the teeth included in the gear are arranged at two opposite ends of the synchronous rotating shaft, so that the rotating slider and the movable strip can be meshed with a respective one of the two opposite ends of the gear respectively.

It should be noted that the middle portion between the two ends of the synchronous rotating shaft is located in the fixing groove of the hinge bracket and can rotate relative to the fixing groove. In some examples, the surface of the middle portion is smooth. As such, when the gear rotates, the obstruction of the hinge bracket to the middle portion can be reduced, and the gear can rotate better.

In the examples of the disclosure, the middle portion of the gear is located in the fixing groove, the position of the gear relative to the hinge bracket can be regarded as a fixed position, and the position of the rotating slider meshed with the gear relative to the hinge bracket is changed along with the rotation of the rotating structure. For example, the rotating slider may rotate close to the hinge bracket, or the rotating slider may rotate away from the hinge bracket, which is not limited by the examples of the disclosure.

In some examples, as shown in FIGS. 5 and 6, the rotating component further includes:

a stopping block 104 fixed on the hinge bracket 101 and covering an opening of the fixing groove 101*b*.

The middle portion 103*b*3 is located between the stopping block 104 and the hinge bracket 101.

That is, the stopping block covers the opening of the fixing groove, so that the gear can be fixed on the hinge bracket without affecting the rotation of the gear.

The stopping block may be fixed on the hinge bracket through a nut and a screw. For example, a nut is arranged on the hinge bracket, a through hole is provided in the stopping block, and a screw penetrates through the through hole to be connected to the nut, so that the stopping block is fixed on the hinge bracket.

In some examples, as shown in FIG. 6, the movable strip 102 is located between the two stopping blocks 104 on the two gears.

In the examples of the disclosure, the movable strip is arranged between the two stopping blocks, so that the movable strip can be limited to move only in the direction perpendicular to a connection direction between the two stopping blocks, but cannot move in the connection direction between the two stopping blocks, thereby achieving the function of limiting the moving direction of the movable strip.

In some examples, as shown in FIG. 2, the hinge bracket 101 is provided with a guide slot 101*c*.

The second meshing portion 102*b* is embedded in the guide slot 101*c*.

That is, the second meshing portion of the movable strip is movable in the guide slot. The guide slot may be configured to limit the moving distance and the moving direction of the movable strip.

In the examples of the disclosure, the contact surface between the second meshing portion and the bottom of the guide slot is smooth. As such, the second meshing portion can move better in the guide slot.

Figure 7:
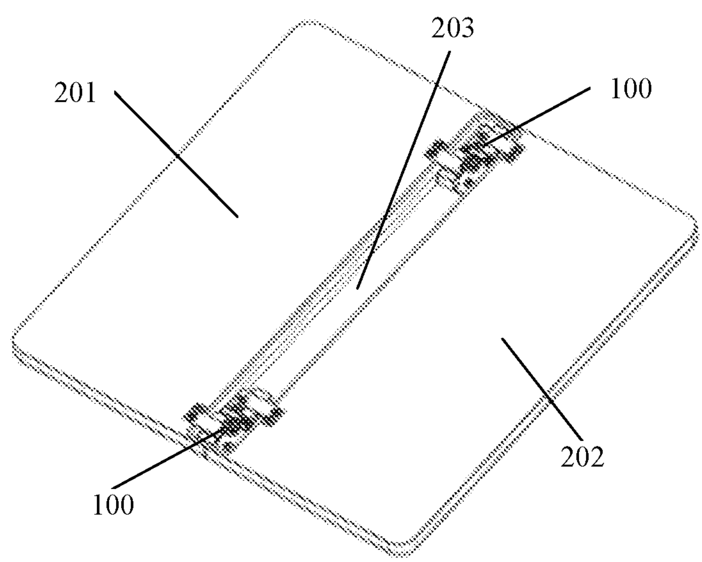
FIG. 7 is a seventh schematic diagram of a rotating component according to one or more examples of the present disclosure.

The examples of the disclosure also provide a terminal device. As shown in FIG. 7, the terminal device includes:

a first middle frame 201;

a second middle frame 202; and at least one rotating component 100 in one or more of the foregoing examples, in which the at least one rotating component 100 is located in a hinge groove 203 formed by the first middle frame and the second middle frame, one of two rotating structures of the rotating component 100 is fixed on the first middle frame and the other one of the two rotating structures of the rotating component 100 is fixed on the second middle frame.

When the two rotating structures rotate synchronously, the first middle frame and the second middle frame are driven to rotate synchronously.

The terminal device is a terminal device with a flexible screen. The terminal device includes a wearable electronic device or a mobile device. The mobile device includes a mobile phone, a laptop, and a tablet computer, and the wearable electronic device includes a smart bracelet, which is not limited by the examples of the disclosure.

A hinge groove is formed between the first middle frame and the second middle frame, which includes: the first middle frame is recessed at a first side edge to form a first groove; the second middle frame is recessed at a second side edge to form a second groove; and when the first side edge is connected with the second side edge, the first groove and the second groove communicate with each other to form the hinge groove.

One of the two rotating structures of the rotating component is fixed on the first middle frame and the other one of the two rotating structures of the rotating component is fixed on the second middle frame, which includes: one of the two rotating portions of two rotating sliders of the two rotating structures is fixed on the first middle frame and the other one of the two rotating portions of two rotating sliders of the two rotating structures is fixed on the second middle frame. Such a fixing manner includes, but is not limited to, fixing by means of screws and nuts.

It should be noted that when the two rotating structures rotate synchronously, the first middle frame and the second middle frame are driven to rotate synchronously. That is, the synchronous rotation of the first middle frame and the second middle frame of the terminal device can be achieved by the rotating component. Moreover, according to the rotating component of the examples of the disclosure, only one movable strip is needed to drive two rotating structures to rotate synchronously, so that the structure of the rotating component can be simplified, the condition of large matching clearance due to an assembly tolerance accumulation caused by complex assembly can be reduced, the synchronization effect of the rotating component can be improved, and the first middle frame and the second middle frame of the terminal device can be further folded or unfolded.

In some examples, the terminal device includes:

a foldable screen covering the first middle frame and the second middle frame and being foldable at the rotating component.

In the examples of the disclosure, the foldable screen is a flexible screen and can be bent. When the rotating component drives the first middle frame and the second middle frame to rotate synchronously, the foldable screen of the terminal device may be switched between an unfolded state and a folded state.

It should be noted that the two rotating structures of the rotating component include a first rotating structure and a second rotating structure. A rotating portion of a rotating slider of the first rotating structure is fixedly connected to the first middle frame, and a rotating portion of a rotating slider of the second rotating structure is fixedly connected to the second middle frame.

In the examples of the disclosure, the synchronous rotation process of the first middle frame and the second middle frame of the terminal device is implemented as follows: 1) when an external force is exerted on the first middle frame, the rotating slider of the first rotating structure is driven to rotate; 2) when the rotating slider of the first rotating structure rotates, the gear of the first rotating structure is driven to rotate; 3) when the gear of the first rotating structure rotates, the movable strip is pushed to move in the guide slot; 4) when the movable strip moves, the gear of the second rotating structure is driven to rotate; and 5) when the gear of the second rotating structure rotates, the rotating slider of the second rotating structure is driven to rotate, so that the rotating slider of the second rotating structure drives the second middle frame to rotate synchronously. As such, when the terminal device is switched between the folded state and the unfolded state, the first middle frame and the second middle frame can be flattened or folded synchronously.

In some examples, there are two rotating components, and one of the two rotating components is located in the hinge groove at one side of the hinge groove and the other one of the two rotating components is located in the hinge groove at another side of the hinge groove opposite to said one side.

In the examples of the disclosure, by arranging the two rotating components, the first middle frame and the second middle frame of the terminal device can rotate smoothly, the pulling of the foldable screen in the rotating process can be reduced, and the service life of the foldable screen can be prolonged.

It should be noted that the terms "first", "second", and "third" in the examples of the disclosure are used merely for convenience of description and differentiation, and have no other specific meaning.

Figure 8:
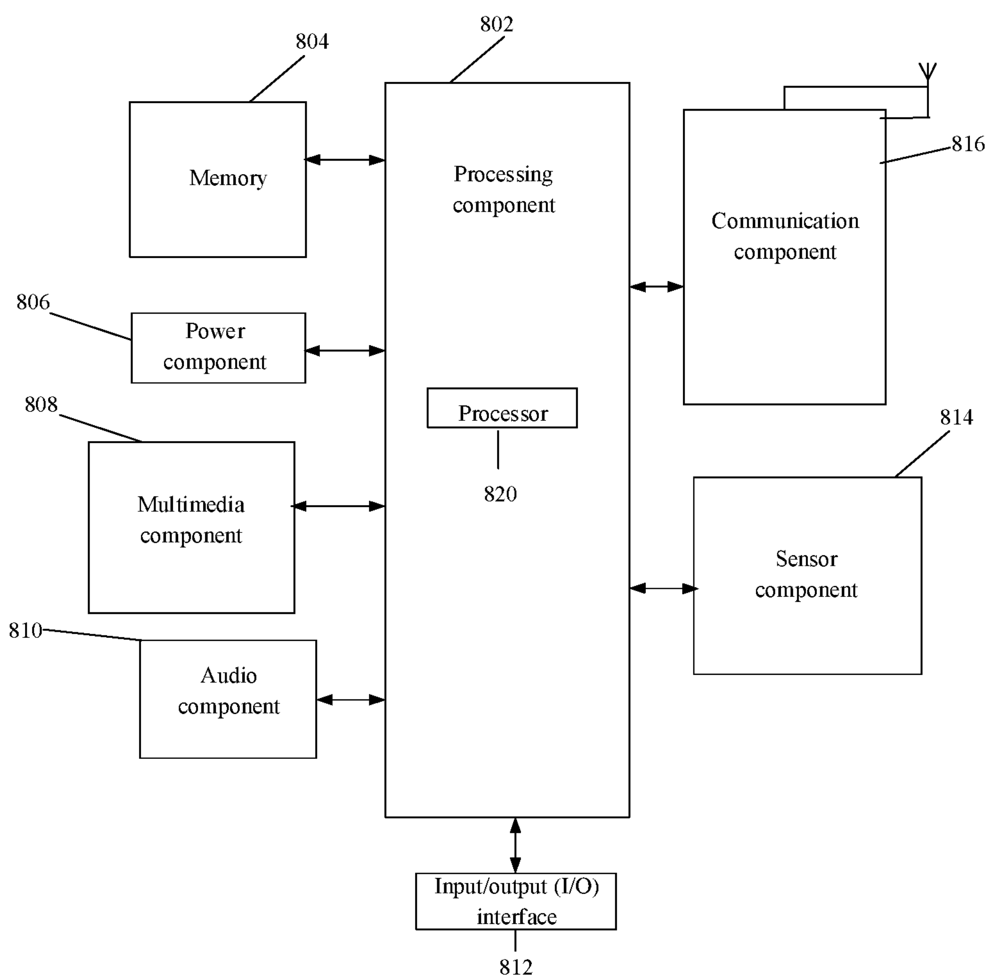
FIG. 8 is a block diagram of a terminal device according to one or more examples of the present disclosure.

FIG. 8 is a block diagram of a terminal device according to an exemplary example. For example, the terminal device may be a mobile phone, a computer, a digital broadcast terminal, a messaging device, a gaming console, a tablet, a medical device, exercise equipment, a personal digital assistant, and the like.

Referring to FIG. 8, the terminal device may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the terminal device, such as the operations associated with display, telephone calls, data communications, camera operations, and recording operations. The processing component 802 may include one or more processors 820 for executing instructions to perform all or part of the steps in the described methods. In addition, the processing component 802 may include one or more components to facilitate the interaction between the processing component 802 and other components. For example, the processing component 802 may include a multimedia component to facilitate the interaction between the multimedia component 808 and the processing component 802.

The memory 804 is configured to store various types of data to support the operation of the terminal device. Examples of such data include instructions for any applications or methods operated on the terminal device, contact data, phone book data, messages, pictures, videos, etc. The memory 804 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The power component 806 provides power to various components of the terminal device. The power component 806 may include a power management system, one or more power sources, and any other components associated with the generation, management, and distribution of power in the terminal device.

The multimedia component 808 includes a screen providing an output interface between the terminal device and a user. In some examples, the screen may include a Liquid Crystal Display (LCD) and a Touch Panel (TP). If the screen includes the TP, the screen may be implemented as a touch screen to receive input signals from the user. The TP includes one or more touch sensors to sense touches, swipes and gestures on the TP. The touch sensors may not only sense a boundary of a touch or swipe action, but also sense a period of time and a pressure associated with the touch or swipe action. The touch sensors may not only sense a boundary of a touch or swipe action, but also sense a period of time and a pressure associated with the touch or swipe action. In some examples, the multimedia component 808 includes a front camera and/or a rear camera. The front camera and/or the rear camera may receive external multimedia data while the terminal device is in an operation mode, such as a photographing mode or a video mode. Each of the front camera and the rear camera may be a fixed optical lens system or may have a focal length and optical zoom capability.

The audio component 810 is configured to output and/or input audio signals. For example, the audio component 810 includes a Microphone (MIC) configured to receive an external audio signal when the terminal equipment is in an operation mode, such as a call mode, a recording mode, and a voice recognition mode. The received audio signal may be further stored in the memory 804 or transmitted via the communication component 816. In some examples, the audio component 810 further includes a speaker for outputting audio signals.

The I/O interface 812 provides an interface between the processing component 802 and peripheral interface components, such as a keyboard, a click wheel, or buttons. The buttons may include, but are not limited to, a home button, a volume button, a start button, and a lock button.

The sensor component 814 includes one or more sensors to provide status assessments of various aspects of the terminal device. For example, the sensor component 814 may detect an open/closed status of the terminal device, and relative positioning of components, e.g., a display and a keypad of the terminal device. The sensor component 814 may further detect a change in position of the terminal device or a component of the terminal device, a presence or absence of user contact with the terminal device, an orientation or an acceleration/deceleration of the terminal device, and a change in temperature of the terminal device. The sensor component 814 may include a proximity sensor configured to detect presence of an object nearby without any physical contact. The sensor component 814 may further include a light sensor, such as a Complementary Metal Oxide Semiconductor (CMOS) or Charge Coupled Device (CCD) image sensor, for use in imaging applications. In some examples, the sensor component 814 may further include an accelerometer sensor, a gyroscope sensor, a magnetic sensor, a pressure sensor, or a temperature sensor.

The communication component 816 is configured to facilitate communication, wired or wireless, between the terminal device and other devices. The terminal device may access a wireless network based on a communication standard, such as a Wireless Fidelity (WiFi) network, a 2nd-Generation (2G) or 3rd-Generation (3G) network or a combination thereof. In one example, the communication component 816 receives a broadcast signal or broadcast associated information from an external broadcast management system via a broadcast channel. In one example, the communication component 816 further includes a Near Field Communication (NFC) component to facilitate short-range communications. For example, the NFC component may be implemented based on a Radio Frequency Identification (RFID) technology, an Infrared Data Association (IrDA) technology, an Ultra-wideband (UWB) technology, a Bluetooth (BT) technology, and other technologies.

In one or more examples, the terminal equipment may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic elements, for performing the above described methods.

Other examples of the disclosure will be apparent to those skilled in the art from consideration of the specification and practice of the disclosure herein. The disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A rotating component, comprising:

a hinge bracket;

a movable strip disposed on the hinge bracket, the movable strip comprising a first meshing portion facing toward the hinge bracket and a second meshing portion facing away from the hinge bracket; and two rotating structures including a first rotating structure and a second rotating structure, the first rotating structure being disposed on a first side of the movable strip and meshed with the first meshing portion, and the second rotating structure being disposed on a second side of the movable strip and meshed with the second meshing portion, wherein when the movable strip moves, the two rotating structures rotate synchronously in opposite rotation directions.

2. The rotating component of claim 1, wherein each rotating structure comprises a rotating slider and a gear, the gear connects the rotating slider and the movable strip with each other, and the movable strip is matched with the gear, and the gear is matched with the rotating slider, wherein when the movable strip moves, two gears of the two rotating structures rotate in opposite rotation directions, and rotation of the two gears drives two rotating sliders of the two rotating structures to rotate in opposite directions.

3. The rotating component of claim 2, wherein each rotating slider is provided with a third meshing portion, and the two rotating structures comprise the first rotating structure and the second rotating structure, the first meshing portion is meshed with a first end of the gear of the first rotating structure, and the third meshing portion of the rotating slider of the first rotating structure is meshed with a second end of the gear of the first rotating structure opposite to said first end, and the second meshing portion is meshed with a first end of the gear of the second rotating structure, and the third meshing portion of the rotating slider of the second rotating structure is meshed with a second end of the gear of the second rotating structure opposite to said first end.

4. The rotating component of claim 2, wherein each rotating slider comprises:

a rotating portion; and a third meshing portion, the third meshing portion being located at a first end of the rotating slider and the rotating portion being located at a second end of the rotating slider opposite to said one end, and the third meshing portion being configured to be meshed with the gear, wherein when an external force is exerted on the rotating portion to drive the rotating portion into rotation, the movable strip is driven to move through the third meshing portion and the gear.

5. The rotating component of claim 4, wherein each rotating slider further comprises:

a trajectory limiting portion disposed opposite to the third meshing portion, the trajectory limiting portion and the third meshing portion being disposed on a same side of the rotating slider, wherein the trajectory limiting portion is provided with an arc-shaped guide groove, an arc-shaped protrusion is disposed on a surface of the hinge bracket facing toward the gear, and the arc-shaped protrusion is embedded in the arc-shaped guide groove.

6. The rotating component of claim 5, wherein the trajectory limiting portion comprises a first arc-shaped block, and a second arc-shaped block spaced apart from the first arc-shaped block, and the first arc-shaped block and the second arc-shaped block form the arc-shaped guide groove.

7. The rotating component of claim 2, wherein each gear comprises a synchronous rotating shaft and teeth at two ends of the synchronous rotating shaft, the hinge bracket is provided with a fixing groove, and the teeth at the two ends of the synchronous rotating shaft are located outside the fixing groove, and a middle portion between the two ends is located inside the fixing groove.

8. The rotating component of claim 7, further comprising:

a stopping block fixed on the hinge bracket and covering an opening of the fixing groove, wherein the middle portion is located between the stopping block and the hinge bracket.

9. The rotating component of claim 8, wherein the movable strip is located between two stopping blocks on the two gears.

10. The rotating component of claim 1, wherein the hinge bracket is provided with a guide slot, and the second meshing portion is embedded in the guide slot.

11. The rotating component of claim 1, wherein the first meshing portion and the second meshing portion are parallel to the hinge bracket.

12. The rotating component of claim 1, wherein the movable strip is Z-shaped.

13. A terminal device, comprising:

a first middle frame;

a second middle frame; and at least one rotating component, the at least one rotating component comprising:

a hinge bracket;

a movable strip disposed on the hinge bracket, the movable strip comprising a first meshing portion facing toward the hinge bracket and a second meshing portion facing away from the hinge bracket; and two rotating structures including a first rotating structure and a second rotating structure, the first rotating structure being disposed on a first side of the movable strip and meshed with the first meshing portion, and the second rotating structure being disposed on a second side of the movable strip and meshed with the second meshing portion, wherein when the movable strip moves, the two rotating structures rotate synchronously in opposite rotation directions, wherein the at least one rotating component is located in a hinge groove formed by the first middle frame and the second middle frame, the first rotating structure of the at least one rotating component is fixed on the first middle frame and the second rotating structure of the at least one rotating component is fixed on the second middle frame, and wherein when the two rotating structures of the at least one rotating component rotate synchronously, the first middle frame and the second middle frame are driven to rotate synchronously.

14. The terminal device of claim 13, comprising:

a foldable screen covering the first middle frame and the second middle frame, the foldable screen being foldable at the rotating component.

15. The terminal device of claim 13, wherein the terminal device comprises two rotating components, and a first rotating component is located in the hinge groove at a first side of the hinge groove and a second rotating component is located in the hinge groove at a second side of the hinge groove opposite to said first side.

* * * * *